(12) United States Patent
Portnoy

(10) Patent No.: US 8,494,808 B2
(45) Date of Patent: Jul. 23, 2013

(54) METHOD FOR OPTIMIZING PARAMETERS FOR DETECTION SYSTEMS

(75) Inventor: David A. Portnoy, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 255 days.

(21) Appl. No.: 13/109,258

(22) Filed: May 17, 2011

(65) Prior Publication Data
US 2012/0259584 A1    Oct. 11, 2012

Related U.S. Application Data

(60) Provisional application No. 61/345,182, filed on May 17, 2010.

(51) Int. Cl.
G06F 19/00    (2011.01)
G06F 17/18    (2006.01)

(52) U.S. Cl.
USPC ........................................... 702/181; 702/179

(58) Field of Classification Search
USPC .......................... 702/179, 181–182, 185, 189
See application file for complete search history.

(56) References Cited

U.S. PATENT DOCUMENTS

| | | | |
|---|---|---|---|
| 5,499,030 A | 3/1996 | Wicks et al. | |
| 7,120,226 B2 | 10/2006 | Ledoux et al. | |
| 7,142,109 B1 | 11/2006 | Frank | |
| 7,430,479 B1 | 9/2008 | Holslin et al. | |
| 7,465,924 B1 | 12/2008 | Klann et al. | |
| 7,550,738 B1 | 6/2009 | DeVito | |
| 7,584,507 B1 | 9/2009 | Nucci | |
| 7,665,663 B2 | 2/2010 | Hoffer et al. | |
| 7,820,977 B2 | 10/2010 | Beer et al. | |
| 7,822,010 B2 | 10/2010 | Becker | |
| 2006/0020830 A1 | 1/2006 | Roberts | |
| 2008/0018332 A1 | 1/2008 | Lieblich et al. | |
| 2008/0069400 A1 | 3/2008 | Zhu et al. | |
| 2008/0251728 A1 | 10/2008 | Madden et al. | |
| 2010/0169030 A1 | 7/2010 | Parlos | |

OTHER PUBLICATIONS

Liu, Y "A genetic clustering method for intrusion detection", Pattern Recognition 37 (2004) 927-942.*
Shon, et al., "A hybrid machine learning approach to network anomaly detection", Information Science, 177 (2007) 3799-3821.*
S. Kirkpatrick, C.D. Gelatt, M.P. Vecchi, Optimization by Simulated Annealing, Science, May 13, 1983, vol. 220, No. 4598, pp. 671-680.
David Portnoy, Peter Bock, Peter Heimberg, Eric Moore, Using ALISA for High-Speed Classification of the Components and their Concentrations in Mixtures of Radioisotopes, Proc. of SPIE vol. 5541, pp. 1-10.
Tom Fawcett, An introduction to ROC analysis, Elsevier, Pattern Recognition Letters 27 (2006) 861-874.
W.W. Peterson, T.G. Birdsall, and W.C. Fox, The Theory of Signal Dectectability, US Army Signal Corps Contract No. Da-36-039sc-15358, pp. 171-212.
Amir-Homayoon Nam and Steve F. Magruder, An adaptive prediction and detection algorithm for multistream syndromic surveillance, BMC Med Inform Decis Mak. 2005; 5: 33. BioMed Central Ltd., vol. 5, pp. 1-11.

* cited by examiner

*Primary Examiner* — Jonathan C Teixeira Moffat
*Assistant Examiner* — Ruihua Zhang
(74) *Attorney, Agent, or Firm* — Noah J. Hayward

(57) ABSTRACT

A method for generating scatter-plots similar to classic ROC curves to gain an understanding of the tradeoffs between probability of detection and probability of false alarm for detections systems. The method uses a stochastic optimization and an objective function to maximize probabilities of detection for probabilities of false alarm that are arbitrarily close to some target probability of false alarm.

3 Claims, 4 Drawing Sheets

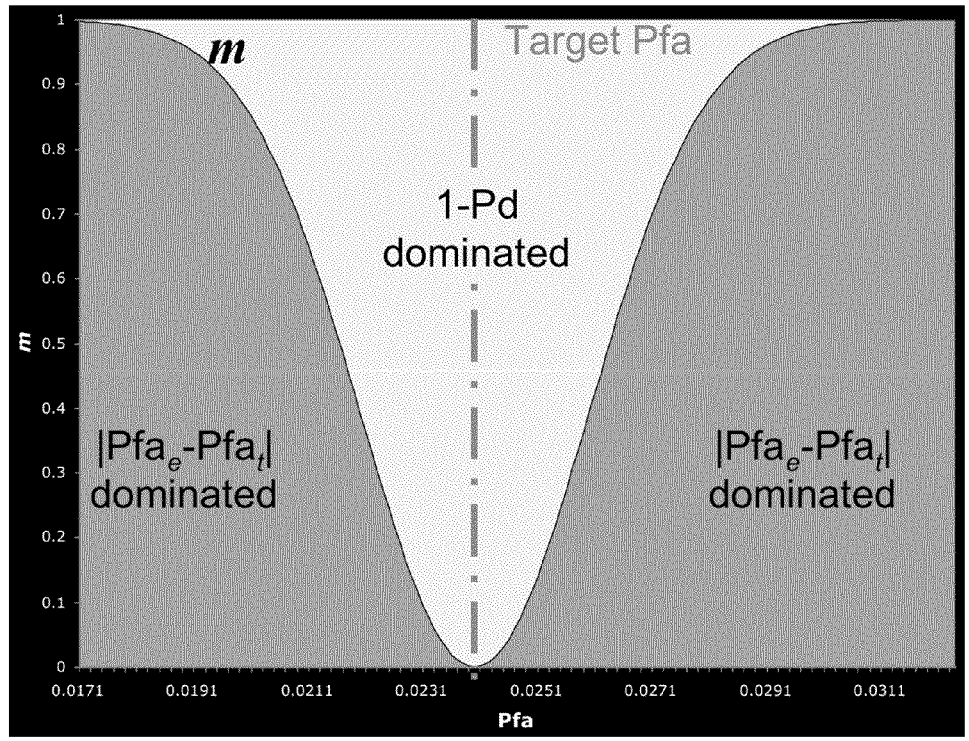

Fig. 1

```
1. Set initial state and temperature
2. Calculate fitness of initial state
3. Repeat until termination (time limit of sufficient fitness)
        1. Randomly generate some neighbor given the current temperature
        2. Calculate fitness of neighbor
        3. IF fitness of neighbor is better than the current best save it
        4. With probability P move to the neighbor given the current temperature
        5. Decrease temperature
```

Fig. 2

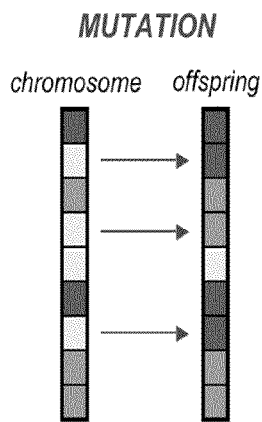
Fig. 3A
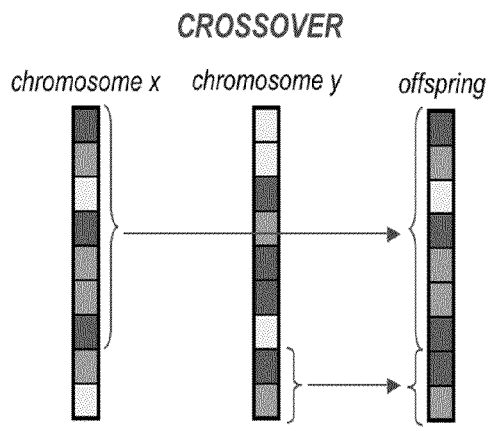
Fig. 3B
1. Generate initial population
2. Calculate fitness of each chromosome in the population
3. Repeat until termination (time limit of sufficient fitness)
    1. Generate offspring using mutation and crossover
    2. Calculate fitness of offspring
    3. Replace the least fit in the population with the most fit offspring
Fig. 4

1. Generate initial chromosomes
2. Set initial state and temperature for each target $P_{fa}$
3. Calculate fitness of each chromosome with respect to each target $P_{fa}$
4. Add chromosomes to target $P_{fa}$ for which they are most fit
5. Repeat until termination (time limit of sufficient fitness)
      6. Crossover and mutate chromosomes given the current temperature
      7. Calculate fitness of the new (cross-over and mutated) chromosome with respect to each target $P_{fa}$
      8. Add any chromosome to target $P_{fa}$ populations for which it is more fit than any of the current members
      9. For each new chromosome added to a population reduce the temperature

Fig. 5

1. For each value $v_i$ in the chromosome
2. Set $\sigma_i = \sigma_{max}\left(\dfrac{t_i}{t_{max}}\right)$ where $t_i$ is the temperature of the chromosome or the temperature of the chromosome's target $P_{fa}$ population if the chromosome is the product of a crossover
3. Select random value $x_i$ from the distribution $N(0, \sigma_i^2)$
4. Set $v_i = v_i + x_i$

Fig. 6

1. For chromosome $c_i$
2. With probability $P$ select a chromosome $c_j$ from the same population as $c_i$
   ELSE select a chromosome $c_j$ from a different population than $c_i$ with equal probability (chromosomes and populations are selected using uniform probability distributions)
3. Perform crossover between $c_i$ and $c_j$ resulting in two new chromosomes

METHOD FOR OPTIMIZING PARAMETERS FOR DETECTION SYSTEMS

CROSS-REFERENCE TO RELATED APPLICATIONS

This application relates to U.S. provisional application No. 61/345,182, filed on May 17, 2010, which is incorporated herein by reference in its entirety.

BACKGROUND OF THE INVENTION

The present invention relates to optimizing parameters for detection systems and, more particularly, to a method for finding parameter values that maximize the probability of detection for a selected number of probabilities of false alarm.

Today there is a tremendous amount of interest in systems that can detect radiological or nuclear threats. Many of these systems operate in extremely high throughput situations where delays caused by false alarms can have a significant negative impact. Thus, calculating the trade-off between detection rates and false alarm rates is critical for these detection systems' successful operation.

Receiver operating characteristic (ROC) curves have long been used to depict the tradeoff between detection and false alarm rates. The methodology was first developed in the field of signal detection. In recent years it has been used increasingly in machine learning and data mining applications. It follows that this methodology could be applied to threat detection systems. However many of these systems do not fit into the classic principles of statistical detection theory because they tend to lack tractable likelihood functions and have many parameters, which, in general, do not have a one-to-one correspondence with the detection classes. In short, currently there is no way to generate ROC curves for algorithms/systems that do not fit into the classic principles of statistical detection theory.

Given enough time and resources an estimation of all probability of detection, probability of false alarm ($P_d$, $P_{fa}$) pairs for an algorithm's parameter combinations at a reasonable granularity can be generated. These estimates can then be graphed on ROC scatter-plot. In general, each $P_{fa}$ value will have several corresponding $P_d$ values. In this case, only the highest $P_d$, and its associated parameter values, for a given $P_{fa}$ are of interest. It is important to note that interpolating between points on this graph is liable to result in incorrect conclusions because it cannot be assumed that an interpolation between parameter values will generate the interpolated ($P_d$, $P_{fa}$) pair.

For algorithms with more than a handful of parameters performing this exhaustive search of the parameter space becomes virtually impossible. For example, to examine a relatively modest 4 values for each parameter of an algorithm with 10 parameters, results in $4^{10}$ combinations of parameters for which $P_d$ and $P_{fa}$ values must be estimated. If each $P_d$ and $P_{fa}$ value requires a conservative 500 samples to compute, and each sample requires 20 seconds to process, the time to generate this very granular estimate of the ($P_d$, $P_{fa}$) pairs would take $(4^{10})(500)(20) \approx 1 \times 10^{10}$ CPU-seconds, or about 330 CPU-years. Even after going through this exercise, it would still be questionable whether such a granular estimate would even be useful.

Thus, two options remain: a guided approach where domain experts and algorithm designers make their best guesses as to the sub-regions of this space to explore, or casting the problem into a global optimization task and use machine learning techniques to perform this optimization. While exploring the parameter space using domain experts and algorithm designers is useful, it can lead to the exclusion of productive portions of the parameter space.

What is needed then is a method that over comes these problems by empirically finding parameter values that maximize the probability of detection for a selected number of probabilities of false alarm.

SUMMARY OF THE INVENTION

Therefore, the present invention has been made in view of the above problems and constraints, and provides an apparatus and method to achieve the above objectives. The method of the invention allows the estimation of portions of a ROC curve for systems with many parameters that do not have tractable likelihood functions and do not have a one-to-one correspondence with each detection class.

More particularly, the inventive method can generate graphs which can be used to select parameters for threat detection systems by optimizing the probability of detection ($P_d$) with respect to several predetermined probabilities of false alarm ($P_{fa}$). Assuming that when the probability of false alarm decreases the best probability of detection associated with that probability of false alarm also decreases, a set of parameters for several probabilities of false alarm can be generated such that the number of expected false alarms can be set according to varying operating conditions.

More specifically, the present invention is directed to a computer program product, comprising a non-transitory computer usable medium having a computer readable program code embodied therein, the computer readable program code adapted to be executed to implement a method for optimizing a plurality of parameters for a detection system to yield a maximum probability of detection for a plurality of predetermined probabilities of false alarm, the method comprising: using a genetic algorithm in combination with a simulated annealing algorithm to minimize an objective function, the genetic algorithm using a chromosome to represent a set of parameter values and the simulated annealing algorithm having a temperature parameter; generating a plurality of chromosomes; setting an initial state; setting a temperature for the system; calculating a fitness of each of the plurality of chromosomes with respect to each of the plurality of predetermined probabilities of false alarm using the objective function; adding each of the plurality of chromosomes to one of the plurality of predetermined probabilities of false alarm for which each of the plurality of chromosomes is most fit; performing a crossover and mutation using the simulated annealing algorithm on each of the plurality of chromosomes; calculating the fitness of each crossed-over and mutated chromosome with respect to each of the plurality of predetermined probabilities of false alarm; adding each mutated chromosome to each of the plurality of predetermined probabilities of false alarm for which it is more fit than any of the chromosomes currently in the plurality of predetermined probabilities of false alarm; decreasing the temperature of the system for each new chromosome added to a population; and repeating the above steps until the objective function is minimized.

BRIEF DESCRIPTION OF THE DRAWINGS

The teachings of the present invention can be readily understood by considering the following detailed description in conjunction with the accompanying drawings, in which:

FIG. 1 is a graph that illustrates mixing value m as a function of estimated $P_{fa}$ and the target $P_{fa}$.

FIG. 2 is a listing of a simple simulated annealing algorithm.

FIG. 3, consisting of FIGS. 3A and 3B, is, respectively, a graphical representation that illustrates mutation and crossover in a genetic algorithm.

FIG. 4 is a listing of a simple genetic algorithm.

FIG. 5 is a listing of the genetic algorithm/simulated annealing hybrid method of the invention.

FIG. 6 is a listing of the genetic algorithm/simulated annealing mutation.

FIG. 8, consisting of FIGS. 8A and 8B, are, respectively, a representative ROC scatter-plot generated using an isotope identification algorithm with a random parameter search and the optimized search; both run for 1,000 iterations; and the region between 0.0 and 0.1 $P_{fa}$, and 0.65 and 1.00 $P_d$ of FIG. 8A.

DETAILED DESCRIPTION

Figures 7, 8A, 8B:
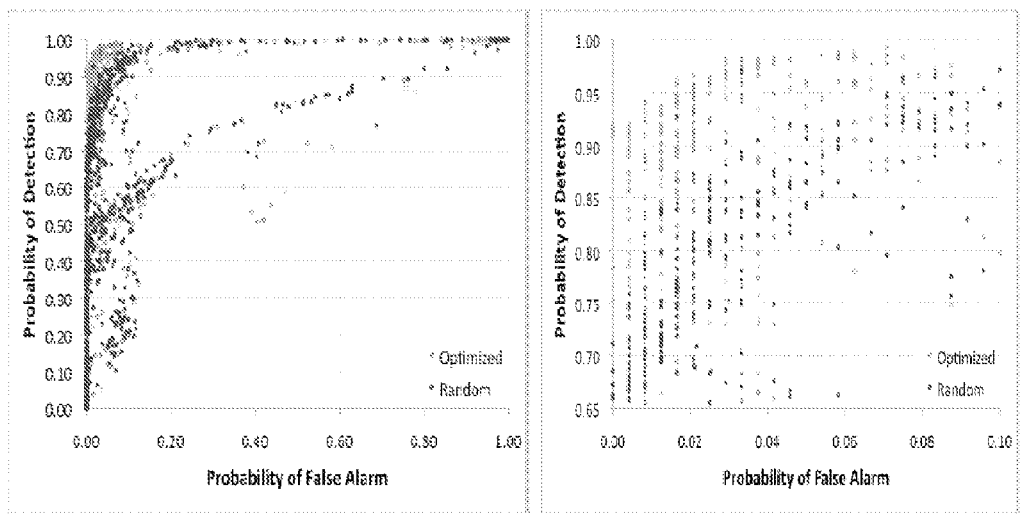
FIG. 7 is a listing of the genetic algorithm/simulated annealing crossover.

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail.

Reference will now be made in detail to the exemplary embodiments of the present invention, examples of which are illustrated in the accompanying drawings.

The inventive method described herein searches a detection system's parameter space using a global optimization technique that seeks to estimate the portions of a ROC curve near the selected $P_{fa}$ values. The method uses a machine-learning method applied to the optimization problem with an aim towards reducing the time required to perform the search while at the same time reducing bias.

Since only the maximum $P_d$ for some predefined set of $P_{fa}$ values (target $P_{fa}$ or $P_{fat}$) is desired, the problem can be cast into to one of global optimization. For this, an objective function and an algorithm to perform the optimization are required. The following objective function is proposed:

$$f(P_d, P_{fat}, P_{fae}) = (1-m)(1-P_d) + m\left|\frac{P_{fae} - P_{fat}}{P_{fat}}\right|$$

where $$m(P_{fat}, P_{fae}) = 1 - \exp\left(\frac{-(P_{fae} - P_{fat})^2}{2\sigma^2}\right)$$

Because the optimization is attempting to find both the maximum $P_d$ and the target $P_{fa}$, the function adjusts the weights of these depending on how far away the estimated $P_{fa}$ ($P_{fae}$) is from the target $P_{fa}$. Thus, when there is a large difference between the estimated $P_{fa}$ and the target $P_{fa}$ the function is dominated by the term representing the difference between these two values. As the estimated $P_{fa}$ gets closer to the target $P_{fa}$, the function becomes dominated by the $P_d$ term as shown in FIG. 1.

The mixing function m that is used to control the transition from $P_{fa}$ to $P_d$ is an unnormalized Gaussian, which has a single parameter σ. Just as the standard deviation in a Gaussian controls the spread of the distribution, the parameter σ in the mixing function controls how close the maximized $P_d$ needs to be to the target $P_{fa}$. Smaller σ values will force the maximized $P_d$ values closer to the $P_{fa}$ targets.

To perform the optimization a combination of two methods are used. Both of these methods are taken from a class of algorithms referred to as metaheuristics or stochastic optimization techniques. In general, these methods are much faster than a random search.

The optimization technique chosen combines elements of simulated annealing (Kirkpatrick, S. Gelatt, C. D.; and Vecchi, M. P. (1983) "Optimization by Simulated Annealing." *Science* 220, 671-680) with elements of genetic algorithms (Holland, J. H. (1992) *Adaptation in Natural and Artificial Systems: An Introductory Analysis with Applications to Biology, Control, and Artificial Intelligence*. MIT Press and Goldberg, D. E. (1989)*Genetic Algorithms in Search, Optimization and Machine Learning*. Addison Wesley Longman, Inc.) all three references being incorporated by reference herein in their entirety. Genetic algorithms were chosen because they can reduce the risk of getting stuck in local minima. However, classic genetic algorithms operate on arrays of Booleans or bit strings, so simulated annealing is employed to perform the mutation in the genetic algorithm.

Simulated annealing uses a random walk to attempt to find a global minimum. It has a temperature parameter that controls the magnitude of the movements and probability that the system will move to a more fit solution. As the algorithm progresses, the temperature decreases and the movements become smaller and it is more likely the system will move to the more fit solution. A simplified version of the simulated annealing algorithm is shown in FIG. 2.

Genetic Algorithms start with some population of parameter value-sets (or chromosomes) and evolves this population, using mutation and crossover, to minimize an objective function. Mutation randomly changes values in the chromosome and crossover takes portions of two chromosomes and creates an offspring with those two portions (FIG. 3). FIG. 4 shows a simplified version of a genetic algorithm.

As shown in FIG. 5, the optimization process begins with a randomly generated and/or manually constructed set of parameter value sets or chromosomes. Each chromosome is used as the parameters for the detection algorithm to analyze a set of benign input files and a set of threat input files. Estimates $P_{fa}$ and $P_d$ are then calculated for the results generated by the detection algorithm, which are then used to calculate the fitness of the chromosome for each target $P_{fa}$ using the objective function. If the population of a target $P_{fa}$ is less than the maximum size or a chromosome has a better fitness than at least one chromosome in the population, the new chromosome is added to the population. If the population size becomes greater than the maximum size, the chromosomes that are least fit are removed. If a new chromosome is added to a population then the temperature of the system is decreased.

Simulated annealing is used for mutation. As shown in FIG. 6, the simulated annealing mutation is performed by adding a normally distributed random variable with mean of 0 to each parameter value in the chromosome. As the temperature goes down, the variance goes down, and the magnitude of the changes (mutations) of the parameter values goes down.

As with classic genetic algorithms, crossover, as shown in FIG. 7, can take place between members of the same target $P_{fa}$ population, but crossover can also take place between members of different target $P_{fa}$ populations. The underlying assumption is that parameters values that yield high $P_d$ values for a given $P_{fa}$ are likely to be close to parameter values that yield high $P_d$ values for a different $P_{fa}$. After a crossover is performed, the two new chromosomes may be mutated. Their fitness is then calculated and the process starts back at the beginning.

Use of the inventive method provided the results shown in FIG. 8 which were generated using an isotope identification algorithm similar to the one described by Portnoy, D., Bock P., Heimberg P. and Moore E., (2004) "Using ALISA for High-Speed Classification of the Components and their Concentrations in Mixtures of Radioisotopes," *Proceedings of the SPIE*, Volume 5541. The only significant difference is the ability to use the non-negative least-squares (NNLS) linear algebra technique (Lawson, C. L., and Hanson, R. J., (1974) *Solving Least Squares Problems*, Prentice-Hall, Chap. 23) in addition to iterative QR factorization (IQRF).

The isotope identification algorithm has 12 parameters: 4 real-valued and 8 Boolean. The real-valued parameters can take on values in the range 0 to 1 inclusive. The $P_{fa}$ targets used were: 0.002, 0.005, 0.01, 0.02, and 0.04. A simulated dataset was used for the optimization study; the "threat" set of spectra contained 540 SNM and industrial signatures, and the "benign" set of spectra contained 240 NORM and medical signatures.

FIG. 8A shows representative ROC scatter-plots for a random parameter search and an optimized parameter search run for 1,000 iterations each. FIG. 8B shows the region between 0.0 and 0.1 $P_{fa}$ and 0.65 and 1.00 $P_d$ of the plot of FIG. 8A. The plots show the optimization focusing its search in the most relevant portions of the space; the upper left-hand corner in the area of low $P_{fa}$ and high $P_d$. It can also be seen that the random parameter search is not able to find parameter values that achieve probabilities of detection that the optimized search can. For instance, the optimized search found parameters values that yield an estimated $P_d$ of 0.92 for a $P_{fa}$ of 0, while the best the random search could do for the same $P_{fa}$ is a $P_d$ of 0.76.

While the above results concentrate on applications to isotope identification algorithms there is no reason why the method of the invention could not be applied to other detection systems that do not fit nicely into statistical detection theory and have many parameters.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope of the appended claims.

What is claimed is:

1. A computer program product, comprising a non-transitory computer usable medium having a computer readable program code embodied therein, the computer readable program code adapted to be executed to implement a method for optimizing a plurality of parameters for a detection system to yield a maximum probability of detection for a plurality of predetermined probabilities of false alarm, the method comprising:

using a genetic algorithm in combination with a simulated annealing algorithm to minimize an objective function, the genetic algorithm using a chromosome to represent a set of parameter values and the simulated annealing algorithm having a temperature parameter, wherein the objective function is:

$$f(P_d, P_{fat}, P_{fae}) = (1-m)(1-P_d) + m\left|\frac{P_{fae} - P_{fat}}{P_{fat}}\right|$$

where $$m(P_{fat}, P_{fae}) = 1 - \exp\left(\frac{-(P_{fae} - P_{fat})^2}{2\sigma^2}\right)$$

where $P_d$ is a probability of detection, $P_{fat}$ is target probability of a false alarm, $P_{fae}$ is estimated probability of a false alarm and $\sigma$ is standard deviation in Gaussian distribution.

2. The computer program product as recited in claim 1, the method further comprising: generating a plurality of chromosomes; setting an initial state setting a temperature for the system; calculating a fitness of each of the plurality of chromosomes with respect to each of the plurality of predetermined probabilities of false alarm using the objective function; and adding each of the plurality of chromosomes to one of the plurality of predetermined probabilities of false alarm for which each of the plurality of chromosomes is most fit.

3. The computer program product as recited in claim 2, the method further comprising: Performing crossover and mutation using the simulated annealing algorithm on each of the plurality of chromosomes; calculating the fitness of each mutated chromosome; calculating the fitness of each crossover and mutated chromosome with respect to each of the plurality of predetermined probabilities of false alarm; adding each mutated chromosome to each of the plurality of predetermined probabilities of false alarm for which it is more fit than any of the chromosomes currently in the plurality of predetermined probabilities of false alarm; decreasing the temperature of the system for each new chromosome added to a population; and repeating the above steps until the objective function is minimized.

* * * * *